Feb. 9, 1971     B. M. HORTON     3,561,842
LIGHT DISRUPTER

Filed April 30, 1965     2 Sheets-Sheet 1

INVENTOR,
BILLY M. HORTON

BY Harry M. Saragovitz
Edward J. Kelly, Herbert Berl
& Charles L. Whitham   ATTORNEYS

INVENTOR,
BILLY M. HORTON

United States Patent Office 3,561,842
Patented Feb. 9, 1971

3,561,842
LIGHT DISRUPTER
Billy M. Horton, Kensington, Md., assignor to the United States of America as represented by the Secretary of the Army
Filed Apr. 30, 1965, Ser. No. 453,887
Int. Cl. G02f 1/02, 1/36
U.S. Cl. 350—160                                    7 Claims

ABSTRACT OF THE DISCLOSURE

An optical device for protecting a viewer from the harmful effects of high intensity optical radiation. This result is accomplished by bonding a light transmissive or reflective film to a roughened substrate. The film is slightly light absorptive, but in no way intereferes with the optical characteristics of the device used. When high intensity optical radiation impinges on the device, the thermal effects of the light absorbed in the film destroy the film and expose the roughened substrate which will materially disrupt the transmission or reflection of light.

---

The invention described herein may be manufactured and used by or for the Government of the United States of America for governmental purposes without the payment to me of any royalty thereon.

This invention relates to eye portection against intense light, and more particularly to optical devices in combination with optical viewing systems for protectng an observer against harmful and blinding effects of intense light that may be encountered under battle-field conditions.

The extremely brilliant flash of light which accompanies the explosion of a nuclear device offers a considerable hazard to the eyes of observers at distances or in locations where they would be safe from other effects of blast, heat and nuclear radiation. Particularly vulnerable to this eye damage are military observers such as tank drivers, artillery battery commanders, aircraft personnel, submarine commanders, and others who, for the successful performance of their jobs, must use powerful optical telescopes, periscopes, and the like to make visual observations of the area where an explosion may occur. In addition to nuclear explosions, there now exists another source of high intensity optical radiation which promises to have considerable military applications. This source is the optical maser or laser. Already, considerable effort is being directed toward the development of communications systems using lasers. While the output power of presently available lasers is insufficient for use as "death rays," the use of lasers as military weapons has been widely suggested. See for example "Lasers Weapons" by Bernard Kovit in the October 1963 issue of Space/Aeronautics at pages 76 to 81. Other military applications include hyper-accurate range finders. The harmful effects to the human eye produced by a laser beam has been recognized in a number of fields. An informative article in this area appears in the March 1963 issue of the Archives of Environmental Health at pages 120 to 123 entitled "Occupational Safety With Laser (Optical Maser) Beams" by Leonard R. Solon. While it is a relatively simple matter for personnel working in a laboratory to set up safe operating procedures, such as closing their eyes at a warning given before a laser is fired or wearing protective goggles with filters that absorb spectral energy at wavelengths known to be in the vicinity of the wavelength of the laser beam, this is not feasible for personnel in military operations where laser equipment, friendly or enemy, is being used. There is, therefore, a need for protection of the eyes of military observers from the harmful effects produced by intense light. Similar protections, if provided, might, of course, be provided for certain delicate optical instruments where protection is not required for a human observer but, rather, for the instrument itself.

A number of solutions to the problem have been attempted, some more or less successful. The use of permanent attenuating filters in a telescope or periscope is generally not acceptable since such filters would severely restrict the usefulness of the observer in normal situations where there was no flash. The most promising solution seems to be a shutter or like device which will permit the use of the full aperture of the optical system but which will be capable of closing rapidly enough to protect the eyes of the observer. The requirements of such a shutter are very severe. Because of the unpredictable nature of the events it is to protect against, the closing of the shutter must be initiated by the light flash itself. The increase of light due to a nuclear detonation or a laser beam occurs in an extremely short period of time. The shutter, in addition to being fast, must also meet the usual miiltary standards for temperature stability and ability to withstand mechanical shock.

One of the earlier attempts to provide protection for observers against intense light is described in ASTIA document number AD 215828 prepared by the Wayne-George Corporation in May 1959, under Air Force Contract Number AF33(616)–5287. This document describes a high-speed, electromechanical goggle which comprises a pair of glass plates held in front of each eye. Each plate is covered with alternate opaque vertical bars and transparent strips. Normally, the plates are positioned so that the opaque bars are superimposed. When a high-intensity flash is detected by a photodetector, the amplified signal triggers a dimple motor to move one of each pair of plates into such a position that the bars of each plate cover the slots of the other. Operation of this device is considered too slow at less than 500 microseconds for adequate protection.

Electro-optic and magneto-optic devices utilizing the Faraday effect, Kerr and Pockels effect, Maxwell effect, and piezoelectric effect have been applied in the design of protective devices. All of these effects either cause birefringence or affect polarized light being transmitted in such a manner that very marked attenuation of transmitted light through the system is possible. More specifically, the Kerr and Pockels effects are electro-optic effects and the Faraday effect is a magneto-optic effect which affect the polarization of light, and the piezoelectric effect and the Maxwell effect cause birefringence of light through a crystal in the former, and through a viscous liquid in the latter. An example of an experimental anti-flash system using a Kerr cell type electro-optical shutter built into a modified battery commander's telescope is described in "Optical Transmission Measurements of an Anti-Flash System" by Robert J. Jenkins and Eugene R. Schleiger of the U.S. Naval Radiological Defense Laboratory. This document is dated June 1960, and has an ASTIA document number AD 245680. In the system described, the Kerr cell has a closure time of less than .01 microsecond, but the minimum closure time is limited by the associated electronic circuitry to approximately one microsecond after the initiating trigger pulse. Certain limitations have prevented acceptance of this type of device for all but a few very special applications. For example, while the Kerr cell principle could be employed to reduce the transmitted light in a very short time, an initial light transmitance of only 15 percent is possible with a small angle of acceptance. In addition, about 20,000 volts is necessary to operate the Kerr cell.

An electrochemical device has also been developed to automatically provide vision protection for aircraft personnel during nuclear flashes. This device is described in ASTIA document number AD 283118 entitled "Electrochemical Light Modulator" prepared by John F. Aitken of the Philco Research Division under Air Force Contract No. AF 33(616)–7928. The device included a reversible electroplating shutter composed of a number of adjacent narrow-band subelements. Each subelement was composed of two rectangular, transparent, tin-oxide-coated glass electrodes. The electrodes were immersed in a transparent electrolyte. When a charge, produced by a current pulse from a photodetection circuit, was placed on the electrodes, silver ions in the electrolyte plated on the electrodes. While it was calculated that it was possible to achieve reaction times of twenty microseconds by placing five shutters back-to-back, the completed shutters were found not to be entirely satisfactory for the application.

There have also been developed directly and indirectly phototropic, opthalmic nuclear flash-protective devices. Such devices are variously described, for example, in the following publications: "The Dynacell and Focal Plane Concepts of Phototropic Systems Application to Ophthalmic Nuclear Flash-Protective Devices," Technical Documentary Report No. MRL–TDR–62–46, May 1962, prepared by Robert W. Harries of Polacoat Incorporated under Air Force Contract No. AF 33(657)–7450; and U.S. Patent No. 3,152,215 to F. E. Barstow and Clifton Lilliot of Edgerton, Germeshausen and Grier, Inc. The photropy phenomenon, recognized since 1881, is the change of absorption of a material when absorption of a particular band of the spectrum occurs. Photoreactive materials may be either organic or inorganic. Several types of mechanisms may occur to produce a change in phototransmissive and photoabsorptive properties of a material; for example, oxidation reduction reactions, salt isomerization, color or F. center formation, or ring closure. Energy dependence of photoreactive materials is an inherent limitation as far as eye-protective devices are concerned.

It is therefore an object of this invention to provide means which can be incorporated into optical systems and which will protect an observer's eyes from intense light.

It is another object of this invention to provide a general class of optical devices which are effective in the presence of light flashes produced by nuclear explosions or laser beams to prevent harmful effects to an observer's eyes.

According to the present invention, the foregoing and other objects are attained by providing within an optical system a reflective or transmissive device at least a portion of which is destroyed or otherwise modified by intense light thereby disrupting the transmission of light to the observer's eyes.

The specific nature of the invention, as well as other objects, aspects, uses and advantages thereof, will clearly appear from the following description and from the accompanying drawing, in which.

Figure 1A:
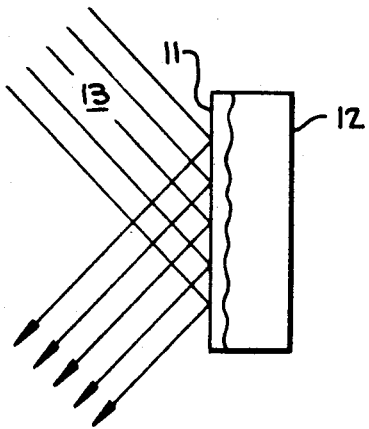
FIGS. 1a and 1b illustrate the operation of a reflective light disrupter device according to the invention.
Figure 1B:
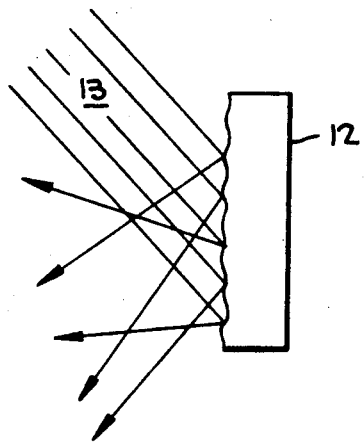

The principle of operation of the several devices according to the invention is the use of the heating effect of absorbed high-intensity radiation to destroy or modify the optical quality of a device or element in an optical system. More particularly, and referring to FIG. 1a of the drawing, the light disrupter device may take the form of a reflector having a thin, polished reflecting metal 11, such as for example aluminum, which has been cohesively attached to a base substrate 12 as by vacuum deposition or plating. The substrate 12 may be a suitable metal such as copper. The interface of the substrate 12 to which the reflecting metal 11 is bonded is roughened so as to present an optically diffusing surface in the absence of reflecting metal 11. The reflecting metal, while a good reflector, absorbs a small portion of the light incident thereon. When the enregy absorbed by the reflecting metal 11 causes the metal to reach its vaporization temperature, it evaporates leaving the substrate 12 as shown in FIG. 1b. The roughened surface of the substrate 12 acts as a diffusing reflector thereby effectively disrupting the light, which is represented in both figures by rays 13.

Figure 2A:
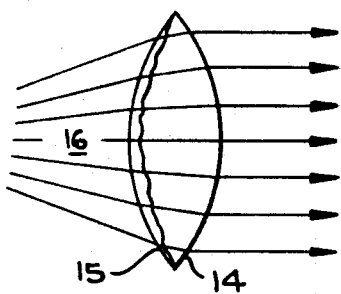
FIGS. 2a and 2b illustrate the operation of a refractive light disrupter device according to the invention.
Figure 2B:
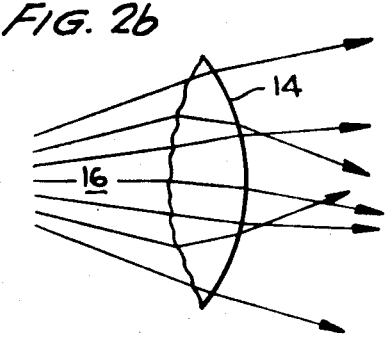

The same principle can also be applied to a transmissive rather than a reflective element. As shown in FIG. 2a, the light disrupter may take the form of a composite lens. The composite lens comprises a base lens 14 made of, for example, quartz. One surface of the base lens 14 is roughened, and to this roughened surface there is cohesively bonded a thin layer of material 15 which is partially transparent and partially absorbing. The material 15 is polished and has an index of refraction approximately equal to the index of refraction of the base lens 14. Silicon monoxide may, for example, be used as the material 15. This compound is completely transparent throughout the visible spectra and is an absorber in the ultraviolet region. When the absorber material 15 evaporates, the light as represented by rays 16 is diffusively refracted by the base lens 14 as shown in FIG. 2b.

Figure 3A:
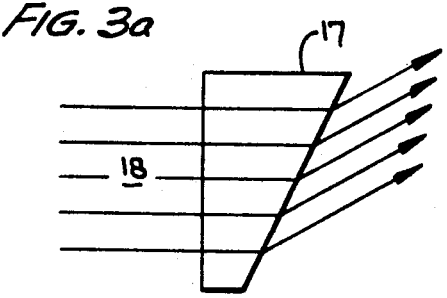
FIGS. 3a and 3b illustrate the operation of a light disrupter device according to the invention which performs the function of a prism in an optical system under normal light conditions.
Figure 3B:
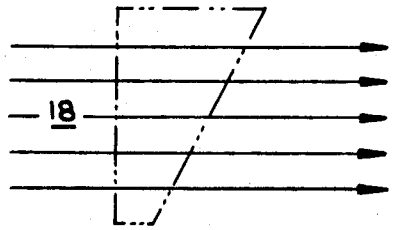

The light disrupter can also take the form of a prism 17 as shown in FIG. 3a. The prism may be made of a low melting point glass or plastic and may be tinted with an organic dye to absorb a desired fraction of the incident light. Under normal conditions, the prism 17 would function to divert light represented by rays 18 toward an observer's eyes. When the energy absorbed by the prism 17 causes it to melt and ultimately evaporate, the light 18 is no longer diverted as shown in FIG. 3b. Thus, the light to the observer's eyes is effectively disrupted.

Figure 4:
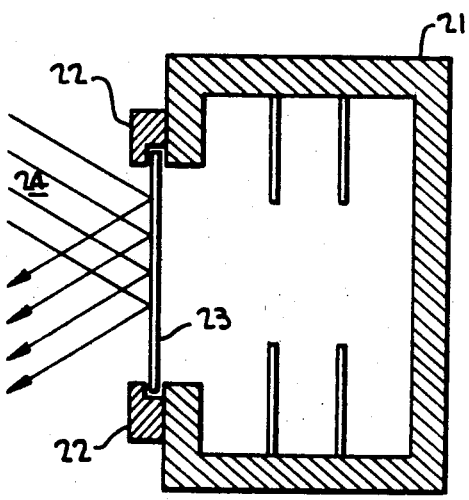
FIG. 4 is a cross-sectional view of a light absorber which incorporates a replaceable reflective light disruptive element which functions according to the invention.

In many military applications it is desirable that the light disrupter be replaceable or reconstituted after the intense light has subsided so that normal operation of the observer may be resumed. A light disrupter of the replaceable type is illustrated in FIG. 4. In this case, there is provided a light absorbing cavity 21 having attached thereto a light disrupter element carrier 22. The disrupter element 23 may be a thin metallic film made of aluminum for example or it may be a thin film of a suitable plastic. In either case, the element 23 acts as a reflector for incident light represented by rays 24. When the disrupter element 23 is evaporated by absorbed energy, the light 24 enters cavity 21 and is absorbed. A new light disrupter element may thereafter be slid into carrier 22, and the optical system restored to its normal function. The replacement of light disrupter elements may be facilitated by making a single element in the form of a long strip and providing an advancing mechanism much the same as the film transport in a camera.

Figure 5A:
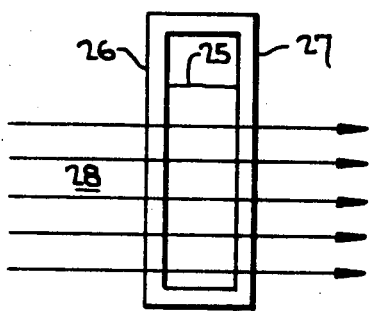
FIGS. 5a and 5b illustrate the operation of a light disrupter device according to the invention which employs a transmissive liquid medium as the light disrupter.
Figure 5B:
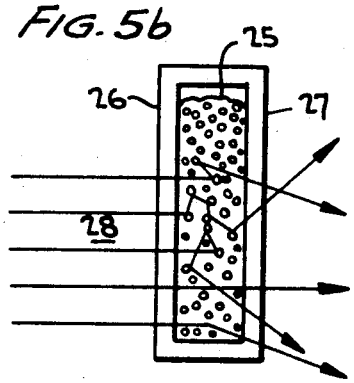

If faster repetitive of the optical system is required, the light disrupter may take the form shown in FIG. 5a. This disrupter is the reconstituting type and comprises a liquid 25 contained between two transparent, parallel glass walls 26 and 27. The liquid 25 may be, for example, silicon tetrachloride or carbon tetrachloride which may be tinted in order that the desired fraction of incident energy may be absorbed. When the liquid 25 is caused to boil by absorbed energy, the light, represented by rays 28, is diffusively transmitted as shown in FIG. 5b. The liquid ceases to boil when the intensity of the light passing through it subsides, and normal operation of the optical system is resumed.

Figure 6:
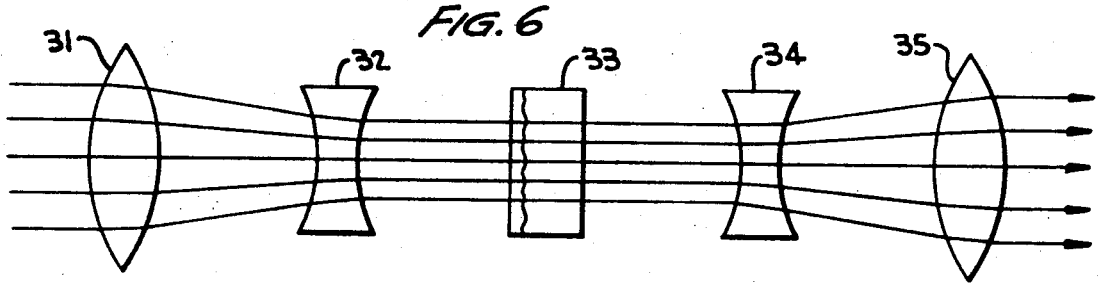
FIG. 6 is a schematic view of an optical system which may be used to concentrate light on any of the light disrupter devices according to the invention to further enhance their operation.

In order to achieve a high intensity of radiation on any of the above described light disrupters, the technique illustrated in FIG. 6 may be employed. The optical column may be brought to a small size by a converging lens 31, brought back into parallelism by a diverging lens 32, reflected or transmitted by a light disrupter generally represented at 33, again diverged by lens 34, and finally brought back to parallelism by converging lens 35.

It will be apparent that the embodiments shown are only exemplary and that various modifications can be made in construction and arrangement within the scope of the invention as defined in the appended claims.

I claim as my invention:

1. In an optical viewing system an optical device for protecting an observer against the harmful and blinding effects of intense light produced by a nuclear explosion, a laser beam or other sources of high intensity optical radiation, comprising a light disrupter means interposed in the optical path of said viewing system for absorbing a small fraction of the light incident thereon and for modifying the optical characteristics of said disrupter means when the thermal effects of the absorbed light exceed a predetermined maximum level but otherwise providing substantially no attenuation or disruption of the light transmitted through said optical viewing system, whereby full aperture viewing is permitted under normal light conditions, but when high intensity optical radiation impinges on said viewing system intense light is prevented from reaching a viewer's eyes.

2. A device for protecting an observer against the harmful and blinding effects of intense light produced by a nuclear explosion, a laser beam, or other sources of high intensity optical radiation as defined in claim 1 wherein said light disrupter element comprises:
   (a) a substrate having a roughened surface; and
   (b) a thin, polished reflecting material, upon which light in said optical viewing system is made to impinge, attached to the roughened surface of said substrate, said reflecting material absorbing a small fraction of the light incident thereon and evaporating when the absorbed light exceeds a predetermined maximum level thereby exposing the roughened surface of said substrate which acts as an optical diffuser.

3. A device for protecting an observer against the harmful and blinding effects of intense light produced by a nuclear explosion, a laser beam, or other sources of high intensity optical radiation as defined in claim 1 wherein said light disrupter element comprises:
   (a) a transparent substrate having a roughened surface; and
   (b) a thin, polished transparent material, upon which light in said optical viewing system is made to impinge, attached to the roughened surface of said substrate and having an index of refraction approximately equal to the index of refraction of said substrate, said transparent material absorbing a small fraction of the light incident thereon and evaporating when the absorbed light exceeds a predetermined maximum level thereby exposing the roughened surface of said substrate which acts as an optical diffuser.

4. A device for protecting an observer against the harmful and blinding effects of intense light produced by a nuclear explosion, a laser beam, or other sources of high intensity optical radiation as defined in claim 3 wherein the combination of said transparent substrate and said thin, polished transparent material are in the form of a lens in said optical viewing system.

5. A device for protecting an observer against the harmful and blinding effects of intense light produced by a nuclear explosion, a laser beam, or other sources of high intensity optical radiation as defined in claim 1 wherein said light disrupter element comprises:
   (a) a light absorbing cavity having an aperture therein; and
   (b) a thin film of reflecting material, upon which light in said optical viewing system is made to impinge, positioned over the aperture in said cavity, said reflecting material absorbing a small fraction of the light incident thereon and evaporating when the absorbed light exceeds a predetermined maximum level thereby permitting the light to pass into said cavity to be absorbed.

6. A device for protecting an observer against the harmful and blinding effects of intense light produced by a nuclear explosion, a laser beam, or other sources of high intensity optical radiation as defined in claim 1 wherein said light disrupter element comprises a refracting prism, upon which light in said optical viewing system is made to impinge, positioned to refract light toward an observer, said prism absorbing a small fraction of the lignt incident thereon and melting when the absorbed lght exceeds a predetermined maximum level thereby preventing intense light from being refracted toward an observer.

7. A device for protecting an observer against the harmful and blinding effects of intense light produced by a nuclear explosion, a laser beam, or other sources of high intensity optical radiation as defined in claim 1 wherein said light disrupter element comprises:
   (a) a pair of parallel, transparent walls; and
   (b) a liquid contained between said transparent walls, the light in said optical viewing system being made to pass through said transparent walls and said transparent liquid contained there-between, said transparent liquid absorbing a small fraction of the light passing there-through and boiling when the absorbed light exceeds a predetermined maximum level thereby causing the light to be diffused.

References Cited
UNITED STATES PATENTS 3,107,529   10/1963   Johnston, Jr. _____ 88—61(A)

VERLIN R. PENDEGRASS, Primary Examiner